United States Patent
Duperray et al.

(10) Patent No.: US 6,334,235 B2
(45) Date of Patent: *Jan. 1, 2002

(54) SELF-DRIVING, SELF-LOCKING AND DAMPING HINGE STRAP, AND A HINGE FITTED WITH SUCH STRAPS

(75) Inventors: Bernard Duperray, Ars; Alain Donzier, Genas; Jacques Sicre, Toulouse, all of (FR)

(73) Assignees: Metravib, R.D.S., Limonest; Centre National d'Etudes Spatiales CNES, Paris, both of (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,095
(22) PCT Filed: Nov. 18, 1997
(86) PCT No.: PCT/FR97/02069
  § 371 Date: Jul. 16, 1999
  § 102(e) Date: Jul. 16, 1999
(87) PCT Pub. No.: WO98/22343
  PCT Pub. Date: May 28, 1998

(30) Foreign Application Priority Data

Nov. 19, 1996 (FR) .............................................. 96 14416

(51) Int. Cl.$^7$ ................................................. E05D 7/11
(52) U.S. Cl. .......................................... 16/225; 16/226
(58) Field of Search .......................... 16/225, 226, 372, 16/385, 387; 403/145, 129, 119, 111

(56) References Cited

U.S. PATENT DOCUMENTS

| 3,386,128 | A | * | 6/1968 | Vyvyan ........................ 16/225 |
| 3,670,358 | A | * | 6/1972 | Schwartz et al. ............. 16/225 |
| 3,770,556 | A | * | 11/1973 | Evans et al. ................... 428/77 |
| 4,587,777 | A | * | 5/1986 | Vasques et al. ................ 52/108 |
| 4,885,820 | A | * | 12/1989 | Erceg et al. .................... 16/225 |
| 4,977,408 | A | * | 12/1990 | Harper et al. ............. 343/792.5 |
| 5,196,857 | A | * | 3/1993 | Chiappetta et al. ......... 343/881 |
| 5,732,743 | A | * | 3/1998 | Livesay ........................ 138/99 |
| 5,785,280 | A | * | 7/1998 | Baghdasarian ............... 244/173 |
| 5,977,932 | A | * | 11/1999 | Robinson .................. 16/226 X |

FOREIGN PATENT DOCUMENTS

FR  2 635 077  * 2/1990 .................. 16/227

OTHER PUBLICATIONS

Definition of viscoelasticity from Encyclopedia Britannica.*

* cited by examiner

Primary Examiner—Anthony Knight
Assistant Examiner—Mark Williams
(74) Attorney, Agent, or Firm—Dennison, Scheiner & Schultz

(57) ABSTRACT

The invention relates to a self-driving and self-locking hinge strap for mounting between two adjacent elements ($A_1$, $A_2$), the strap being of the type constituted by at least one resilient strip (3) preformed to have a section that is curved and designed to be secured via its two ends to the two elements, and to occupy a folded position and a deployed position. According to the invention, each resilient strip (3) is provided with a layer of viscoelastic material (4) interposed between one of the faces of the resilient strip (3) and a stress plate (5) in such a manner as to provide a hinge that also performs a damping function.

11 Claims, 2 Drawing Sheets

SELF-DRIVING, SELF-LOCKING AND DAMPING HINGE STRAP, AND A HINGE FITTED WITH SUCH STRAPS

TECHNICAL FIELD

The present invention relates to the technical field of link elements between parts or elements in general, enabling the assembled-together parts to move angularly, and it relates more particularly to hinges adapted to enable the two united elements to be deployed automatically, and also enabling them to be self-locking in the deployed position.

PRIOR ART

In the preferred field of application of the invention, namely space applications, it is known that the solar panels of satellites can be hinged by means of hinges that suffer from lack of reliability and from the friction that exists between parts that are in contact. In addition, such hinges are fitted with drive means for the purpose of displacing the solar panels. Hinges of that type, having high levels of friction, require the drive to be overdimensioned in order to obtain a sufficient margin for deploying the panels. When friction is low, then as a consequence, shock at the end of deployment is large. To limit such shock, provision is made for a hinge to be associated with a system for regulating speed, and that leads to implementing a hinge that is relatively complex.

In an attempt to remedy those drawbacks, U.S. Pat. No. 3,386,128 and French patent FR 2 635 077 have proposed connecting together the two hinged elements by means of a plurality of resilient blades of circularly arcuate section, each blade being fixed at respective ends to the two hinged elements. Each hinge strap made in that way, also known as a Carpenter strap, is designed to be folded so as to apply a driving torque between the united elements that tends to deploy them automatically. When the resilient blades are in the deployed position, they exert a locking force between the hinged-together elements. That provides a hinge which is both self-driving and self-locking.

Nevertheless, it turns out that hinges of that type suffer from a first drawback relating to lack of control over the locking of the elements in the deployed position. When the hinge strap reaches its deployed position, and since the opening speed is not zero, it can happen that either the equilibrium position is overshot causing unlocking to take place, or else that a rebound movement occurs causing the hinge to reclose.

Such a hinge suffers from another drawback which is that shocks appear when the hinge locks. During such locking, residual kinetic energy causes the hinge to oscillate about its equilibrium position. The linked-together pieces are therefore subjected to forces of magnitude that increase with increasing amounts of residual kinetic energy. Such stresses lead to the link elements being overdimensioned.

SUMMARY OF THE INVENTION

The object of the invention is thus to remedy the drawbacks specified above by proposing a hinge strap that is designed to unite two elements in the general sense, and to provide self-drive and self-locking functions, with the hinge strap being designed so as to control the locking of the elements in the deployed position so that during locking of the hinge, shocks are reduced or even eliminated.

To achieve this object, the invention seeks to provide a self-driving, self-locking hinge strap that presents damping ability.

In accordance with the invention, the hinge strap of the invention is designed to be mounted between two adjacent elements, and is of the type constituted by at least one resilient strip preformed to be of circularly arcuate section and designed to be secured via its two ends to the two elements, and to occupy a folded position and a deployed position.

In accordance with the invention, each resilient strip is provided with a layer of viscoelastic material interposed between one of the faces of the resilient strip and a stress plate so as to obtain a hinge that also provides a damping function.

The invention also seeks to provide a hinge comprising an assembly of hinge straps of the invention. In a preferred embodiment, the hinge comprises first and second assemblies each made up of three hinge straps distributed in two planes.

Various other characteristics appear from the following description given with reference to the accompanying drawings which show, by way of non-limiting examples, embodiments and implementations of the invention.

BEST METHOD OF PERFORMING THE INVENTION

Figure 1:
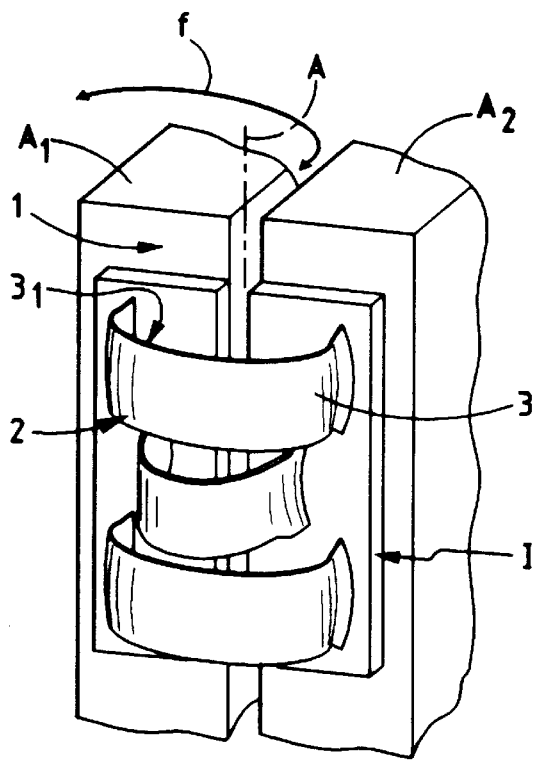
FIG. 1 is a fragmentary diagrammatic view showing an embodiment of a hinge of the invention in the folded position.
Figure 2:
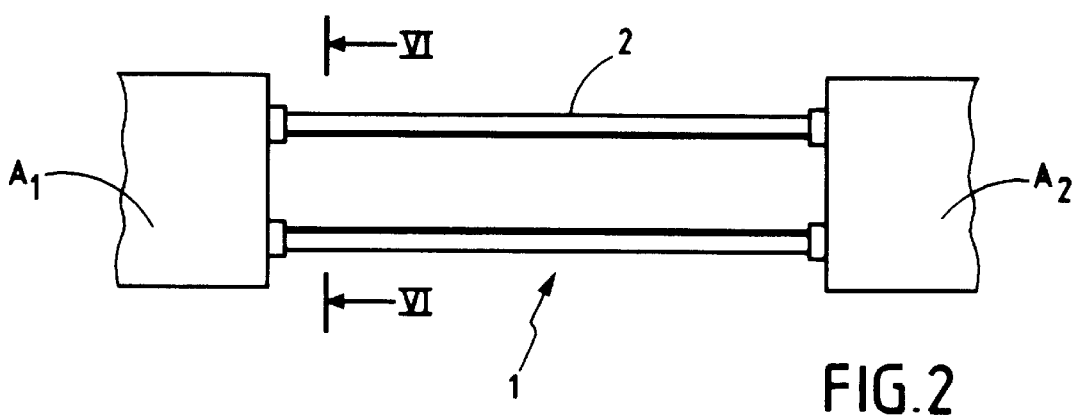
FIG. 2 is a plan view of the hinge shown in FIG. 1, when placed in its deployed position.

FIGS. 1 and 2 show an embodiment of a hinge 1 of the invention designed to be mounted between two adjacent elements or parts $A_1$ and $A_2$ of any kind and of appropriate shape. The hinge 1 is designed to go from a "folded" position shown in FIG. 1 to a "deployed" position shown in FIG. 2, thus enabling the parts $A_1$ and $A_2$ to be moved relative to each other through 180° about a pivot axis A. In the example shown in FIGS. 1 and 2, the hinge 1 is made up of a series of hinge straps 2 of the invention that provide a self-driving function, a self-locking function, and a damping function.

Figure 3:
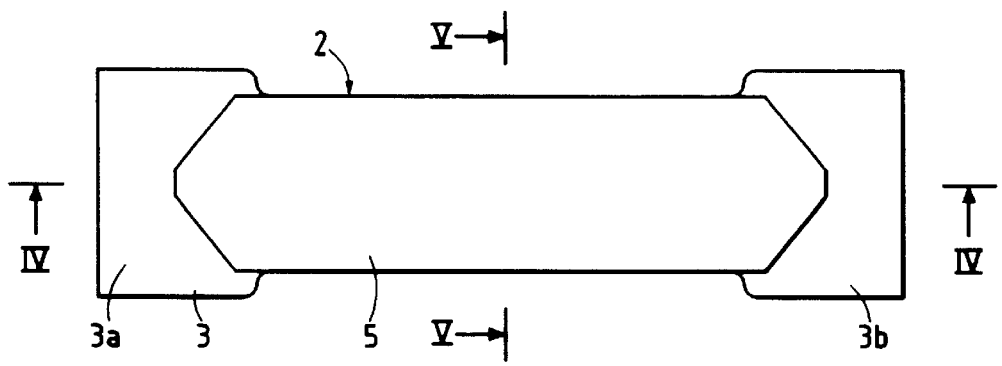
FIG. 3 is a detail elevation view of a hinge strap of the invention.
Figure 4:
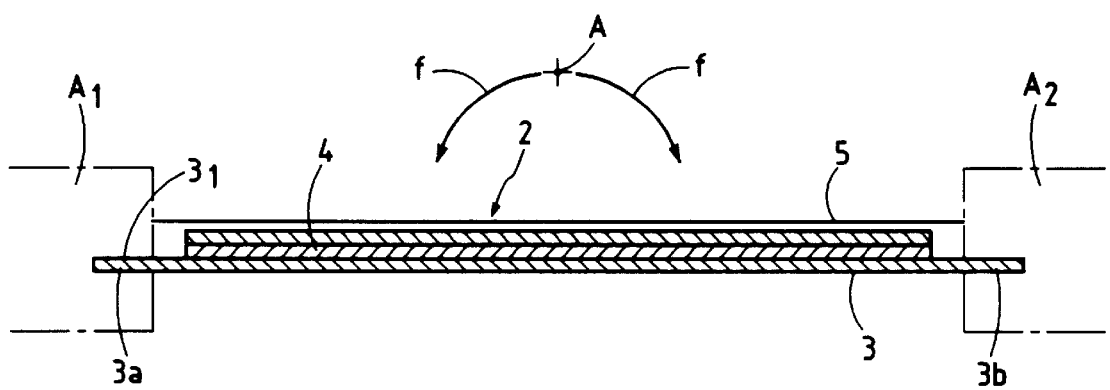
FIG. 4 is a longitudinal section taken substantially on lines IV—IV of FIG. 3.
Figure 5:
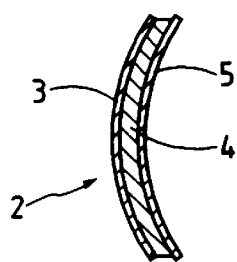
FIG. 5 is a cross-section taken substantially on lines V—V of FIG. 3.

As can be seen more clearly from FIGS. 3 to 5, each hinge strap 2 comprises a resilient strip 3 that is preformed to have a right cross-section that is curved. For example, the resilient strip can be made from a metal tape having a right cross-section that is in the form of a circular arc. At rest or in the locking position, each resilient strip 3 occupies a rectilinear position with a section that is curved, while in a position that is folded in a transverse direction, the resilient strip possesses driving torque tending to return it to its rectilinear or locking position, which it conserves.

In accordance with the invention, each resilient strip 3 is provided with a layer 4 of viscoelastic material interposed between one of the faces $3_1$ of the resilient strip and a stress plate 5. The viscoelastic material 4 is thus sandwiched or clamped over its entire area between the strip 3 and the stress plate 5. By way of example, the viscoelastic material 4 adheres to the strip 3 and to the plate 5. The strip 3 and the plate 5 are both of high stiffness so that a relatively large amount of mechanical energy can be stored in the viscoelastic material in order to allow it to provide effective damping. In order to increase the shear in the viscoelastic material, provision can be made for the strip 3 and the plate 5 to be secured to each other at one end, e.g. by means of a rivet.

When the hinge strap is opening, i.e. when it is passing from its folded position to its deployed position, the energy dissipated by shear of the viscoelastic material 4 serves to damp the hinge strap. The variation in the elasticity modulus of the viscoelastic material as a function of the rapidity with which it is stressed serves to modulate the intensity of the driving torque of the hinge strap as a function of the speed with which it opens. Thus, in the event of the hinge being difficult to open, little energy is degraded, whereas in the event of it being easy to open, displacement of the hinge is highly damped. The viscoelastic material is selected so that a sufficient fraction of the energy is dissipated during opening of the hinge to ensure that locking is stable. Furthermore, the viscoelastic material is selected so as to be effective over the entire range of utilization temperatures and for all of the frequencies implemented relating to static or quasi-static conditions. By way of example, the viscoelastic material could be an acrylic polymer from the family of substances sold by the 3M company under the reference ISD.

According to a characteristic of the invention, the layer of viscoelastic material 4 and the stress plate 5 are fitted to the strip over a length that is shorter than the length of the strip. The layer of viscoelastic material 4 and the stress plate 5 are thus mounted on a central portion of the strip 3, such that the strip 3 projects via two terminal portions 3a and 3b. In order to avoid any folding of the strap in these terminal portions that are not covered by the material 4 and the plate 5, the stiffness of the terminal portions 3a, 3b is increased. For example, the terminal portions 3a, 3b of the strip are of a width greater than the width of the central portion of the strip. The hinge strap 2 is thus constrained to be folded in its central portion which is fitted with the viscoelastic material 4 and the stress plate 5. By avoiding folding of the strap in its end zones that have no viscoelastic material, the hinge strap is always in a position to provide its damping function.

According to another characteristic of the invention, the layer of viscoelastic material 4 and the stress plate 5 are situated on the inside face of the strip 3, where "inside" is relative to the position occupied by the hinge strap 2 when folded. Thus, as can be seen in FIGS. 1 and 4, the layer of viscoelastic material 4 is placed on the inside face $3_1$ of the strip 3 relative to the opening direction of the hinge as represented by arrows f. The positioning of the viscoelastic material 4 and of the stress plate 5 on the inside of the hinge makes it possible to avoid traction being applied to the viscoelastic material at the ends of the hinge strap, and thus makes it possible to avoid it coming unstuck.

According to another characteristic of the invention, the layer of viscoelastic material 4 and the stress plate 5 have terminal portions that are chamfered or truncated so as to minimize any risk of peeling (FIG. 3).

According to another characteristic of the invention, the layer of viscoelastic material 4 is mounted on the resilient strip so that the material is not stressed in the folded position of the hinge strap. To this end, the viscoelastic material is mounted on the resilient strip while it is itself in a folded position.

The hinge strap of the invention is mounted by any appropriate means via its ends 3a and 3b to the elements that are to be united $A_1$ and $A_2$. In a preferred embodiment, the ends 3a and 3b are mounted by being embedded within the elements $A_1$ and $A_2$ that are to be united, as shown in FIG. 4.

Figure 6:
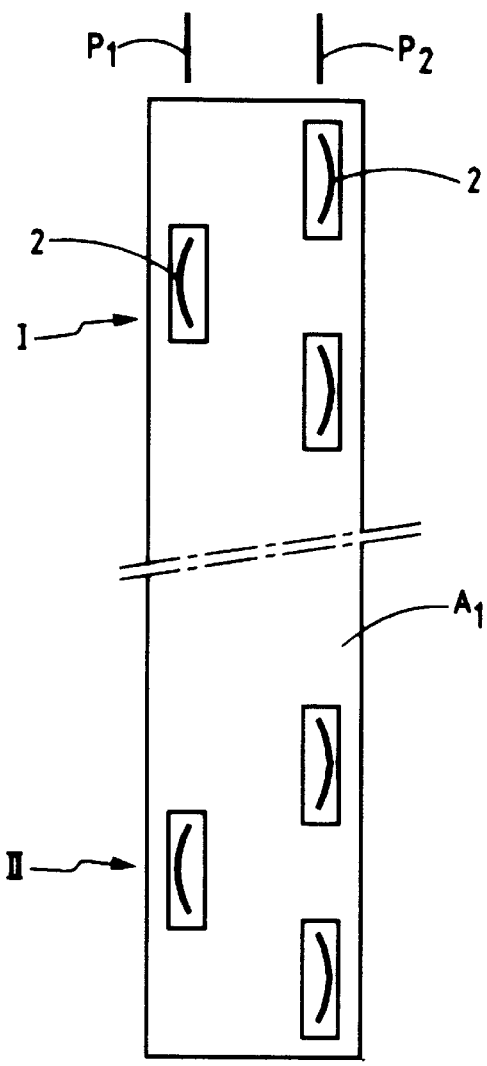
FIG. 6 is a section in elevation taken substantially on lines VI—VI of FIG. 2.

FIGS. 1, 2, and 6 show a preferred embodiment of the hinge strap 2 of the invention for making a hinge 1 for two pieces $A_1$ and $A_2$. The hinge 1 comprises a series of hinge straps 2 of the kind described above, and preferably a first assembly I and a second assembly II each made up of three such hinge straps 2. For each assembly, one of the straps 2 is mounted in one plane $P_1$ while the other two straps 2 are mounted in another plane $P_2$ offset from the plane $P_1$. Each strap 2 placed in the plane $P_1$ is situated at a level that is intermediate between the other two straps placed in the plane $P_2$. As can be seen more precisely from FIG. 6, the straps 2 are mounted so that the concave sides of the straps placed in the planes $P_1$ and $P_2$ face in opposite directions. In addition, the sole strap placed in the plane $P_1$ is mounted in such a manner that when it is in its folded position its concave side faces outwards. Under such conditions, the sole strap placed in the plane $P_1$ provides driving torque that is greater than that developed by the other two straps placed in the plane $P_2$.

In the above example, the elements $A_1$ and $A_2$ are hinged together solely by means of the straps 2. Naturally, it could be envisaged for the elements $A_1$ and $A_2$ to be interconnected by means of a guide system, for example a hinge axis or a ball-and-socket arrangement.

Industrial Applicability

The invention lies in a particularly advantageous application in the field of self-driving and self-locking hinges for elements used in space, for example the solar panels of satellites, the covers of telescopes, reflectors, radiators, etc. Numerous other applications of the invention can be found in which parts are to be assembled together by a hinge that is self-driving and self-locking. By way of example, mention can be made of robotics.

What is claimed is:

1. A self-driving and self-locking hinge strap for mounting between two adjacent elements ($A_1$, $A_2$), the strap being of the type constituted by at least one resilient strip (3) preformed to have a section that is curved and designed to be secured via its two ends to the two elements, and to occupy a folded position and a deployed position, the strap being characterized in that each resilient strip (3) is provided with a layer of viscoelastic material (4) interposed between one of the faces of the resilient strip (3) and a stress plate (5) in such a manner as to provide a hinge that also performs a damping function, said viscoelastic material having an elasticity modulus which varies as a function of the speed at which said material is stressed.

2. A hinge strap according to claim 1, characterized in that the layer of viscoelastic material (4) is placed on the face ($3_1$) of the strip which is situated on the inside when the hinge strap is occupying its folded position.

3. A hinge strap according to claim 1, characterized in that the layer of viscoelastic material (4) and the stress plate (5) are mounted on a limited central portion of the strip to leave terminal portions ($3_1$, $3_2$) of the strip remaining at each end said terminal portions having a stiffness greater than that of the central portion so as to cause the strap to fold in said central portion.

4. A hinge strap according to claim 1, characterized in that the layer of viscoelastic material (4) and the stress plate (5) have terminal portions that taper.

5. A hinge strap according to claim 1, characterized in that the layer of viscoelastic material (4) is mounted on the resilient strip (3) in such a manner that the material is not stressed when the hinge strap is in its folded position.

6. A hinge strap according to claim 1, characterized in that the stress plate (5) and the resilient strip (3) are fixed together at one of their ends, so as to increase the shear in the viscoelastic material (4).

7. A hinge strap according to claim 1, characterized in that the resilient strip is mounted via its two ends by being embedded in the two elements.

8. A hinge self-driving, self-locking, and damping hinge mounted between two adjacent elements ($A_1$, $A_2$), characterized in that said strap includes at least one hinge strap according to claim 1.

9. A hinge according to claim 8, characterized in that it includes first and second assemblies (I, II) each constituted by three hinge straps (2) occupying two planes ($P_1$, $P_2$).

10. A hinge according to claim 9, characterized in that each strap (2) situated in a one plane ($P_1$) has its concave side facing in the opposite direction to the concave sides of the straps (2) situated in the other plane.

11. A hinge strap for mounting between two adjacent elements ($A_1$, $A_2$), the strap being of the type constituted by at least one resilient strip (3) preformed to have a section that is curved and designed to be secured via its two ends to the two elements, and to occupy a folded position and a deployed position, the strap being characterized in that each resilient strip (3) is provided with a layer of viscoelastic material (4) having an elasticity modulus which varies as a function of the speed at which said material is stressed interposed between one of the faces of the resilient strip (3) and a stress plate (5), whereby said viscoelastic material provides both a driving force and a damping force when said hinge strap shifts from said folded position to said deployed position.

* * * * *